United States Patent [19]

Haag et al.

[11] 4,373,193

[45] Feb. 8, 1983

[54] LOGIC STATE ANALYZER

[75] Inventors: George A. Haag, Colorado Springs; O. Douglas Fogg, Loveland; Gordon A. Greenley; Steve A. Shepard, both of Colorado Springs, all of Colo.; F. Duncan Terry, Meridan, Id.

[73] Assignee: Hewlett-Packard Company, Palo Alto, Calif.

[21] Appl. No.: 210,462

[22] Filed: Nov. 25, 1980

Related U.S. Application Data

[63] Continuation of Ser. No. 75,787, Sep. 17, 1979, abandoned, which is a continuation of Ser. No. 828,138, Aug. 29, 1977, abandoned.

[51] Int. Cl.$^3$ .......................... G06F 3/05; G06F 3/153
[52] U.S. Cl. ........................... 364/900; 340/146.3 WD
[58] Field of Search ... 364/200 MS File, 900 MS File; 340/146.3 MA, 146.3 WD, 146.3 QT, 146.3 Y, 146.3 Z

[56] References Cited

U.S. PATENT DOCUMENTS

| | | | |
|---|---|---|---|
| 3,406,387 | 10/1968 | Werme | 364/900 |
| 3,457,552 | 7/1969 | Asendorf et al. | 340/146.3 T |
| 3,988,715 | 10/1976 | Mullan et al. | 340/146.3 WD |
| 4,100,532 | 7/1978 | Farnbach | 340/146.3 MA |
| 4,119,946 | 10/1978 | Taylor | 340/146.3 Q |
| 4,192,966 | 3/1980 | Mayer | 340/146.3 WD |

*Primary Examiner*—Harvey E. Springborn
*Attorney, Agent, or Firm*—Edward L. Miller

[57] ABSTRACT

A logic state analyzer stores into a data acquisition memory only state data meeting preselected qualification state criteria chosen to weed out state data not of interest among the totality of states occuring within a collection of digital signals. The data acquisition memory retains only the last m-many states stored therein. A selectable integer k, $o \leq k \leq m$, determines how many additional storage operations are performed for qualified state data following the detection of a preselected trigger condition. The actual number of states occurring in the collection of digital signals after the trigger condition but before the storage of the kth qualified data state can be many times the value of k. Qualifying the state data prior to storage allows a modest size data acquisition memory to do the work of a much larger memory and spares the user the task of sorting through much state data known not to be of interest. The preselected qualification criteria may include don't-cares in the definition of the qualification state, as well as the logical OR'ing of a plurality of such qualification states.

7 Claims, 16 Drawing Figures

--------FORMAT SPECIFICATION--------TRACE-COMPLETE--------------------

```
CLOCK SLOPE  ▮
   (+,-)
              POD        POD4        POD3        POD2        POD1
              PROBE     7------0    7------0    7------0    7------0
LABEL ASSIGNMENT         ▮▮▮▮▮▮▮▮   ▮▮▮▮▮▮▮▮   ▮▮▮▮▮▮▮▮   ▮▮▮▮▮▮▮▮
  (A,B,C,D,E,F,X)        !!!!!!!!   !!!!!!!!   !!!!!!!!   !!!!!!!!
                                      ACTIVE CHANNELS

LABEL       A          D          F
LOGIC POLARITY           ▮▮         ▮▮         ▮▮                    ▮▮▮   DESIGNATES A
   (+,-)                                                                   SELECTABLE
NUMERICAL BASE           ▮▮▮        ▮▮▮        ▮▮▮                         ENTRY FIELD
   (BIN,OCT,DEC,HEX)                                                 FIGURE 1
```

--------TRACE SPECIFICATION--------TRACE-COMPLETE--------------------

```
              LABEL      A      D   F    OCCUR
              BASE       HEX    HEX BIN  DEC

FIND IN SEQUENCE         ▮▮▮▮   ▮▮  ▮    ▮▮▮▮▮
          THEN           ▮3E▮   ▮▮  ▮    ▮▮▮▮▮
          THEN           ▮▮E▮   ▮▮  ▮    ▮▮▮▮▮
 ▮START▮  TRACE          ▮3E▮

SEQ RESTART ▮ON▮ ▮3E▮   ▮X▮  ▮

TRACE
 ▮ON▮ ▮STATE▮   ▮3E▮    ▮X▮  ▮    ▮▮▮▮▮

COUNT  ▮STATE▮   ▮3E▮   ▮X▮  ▮                      FIGURE 2
```

------------TRACE LIST--------------TRACE-COMPLETE------------------

```
          LABEL     A      D    F   STATE COUNT
          BASE      HEX    HEX  HEX    DEC
                                      ▮▮▮▮▮
SEQUENCE...03CF....5D....0....
SEQUENCE    03E2    A2    0                  2
SEQUENCE    00E1    C6    0                  3
   START    03E3    82    0                  1
    +01 ...03E3...E1....0............1
    +02    03E3    E5    0                   1
    +03    03E4    82    0                   1
    +04    03E4    03    0                   1
    +05 ...03E4...47....0............1
    +06    03E1    A2    0                   1
    +07    03E1    1D    0                   1
    +08    03E1    5D    0                   1
    +09 ...03CE...5D....0............1
    +10    03CE    44    0                   1
    +11    03E2    A2    0                   1
    +12    03E2    C2    0                   1
    +13 ...03E2...C6....0............1
    +14    00E1    C6    0                   1
    +15    03E3    82    0                   1
    +16    03E3    E1    0                   1
```

FIGURE 3

LOGIC STATE ANALYZER

REFERENCES TO RELATED APPLICATIONS

This application is a continuation of an earlier filed copending application Ser. No. 075,787, filed on Sept. 17, 1979, by George A. Haag et al, and entitled LOGIC STATE ANALYZER, which is now abandoned and which was in turn a continuation of a now abandoned application of the same inventors and title, Ser. No. 828,138, filed on Aug. 29, 1977.

The subject matter of the present application is related to the subject disclosed in U.S. Pat. No. 4,040,025, issued to Justin S. Morrill, Jr., on Aug. 2, 1977, and which was filed on Mar. 31, 1976.

The subject matter of the present application is also related to the subject disclosed in U.S. Pat. No. 4,100,532, issued to William A. Farnbach on July 11, 1978, and which was filed on Nov. 19, 1976.

U.S. Pat. Nos. 4,040,025 and 4,100,532 to Morrill et al and Farnbach, respectively, are hereby expressly incorporated by reference.

BACKGROUND AND SUMMARY

Prior art logic state analyzers have had small to modest sized data acquisition memories that stored every data state occurring in the collection of digital signals being measured. Since the size of the trace is limited to the length of the memory, this reduces the extent of the trace, as well as including states that may be known in advance to be of no interest. For example, it may be necessary to find out how the contents of a certain memory location are getting "bombed". Write memory cycles to that address are definitely of interest, but perhaps little else. By establishing a qualification state criterion such as "write memory cycle while address equals $3456_8$" only state data that is potentially of interest is stored in the data acquisition memory, thus magnifying the apparent size of that memory, while also sparing the user the task of sorting through utterly unrelated data in the trace.

This type of data storage qualification is accomplished in a Logic State Analyzer by allowing the user to define a plurality of qualification states, each possibly including don't-care symbols as part of their value, thus making such a qualification state a range. If more than one qualification state is defined, the plurality thereof is OR'ed to obtain the actual qualification state criterion. No state data is stored in the data acquisition memory unless it meets the qualification criterion. Storage qualification can also be termed a "selective trace", and is occasionally referred to as such herein.

DESCRIPTION OF THE FIGURES

FIG. 1 illustrates the interactive format specification display.

FIG. 2 illustrates the interactive trace specification display.

FIG. 3 illustrates a trace list display of the stored data states.

FORMAT SPECIFICATION

Data formatting permits the partitioning of 32 input data channels into parameters of interest. Contiguous data channels which behave as a single parameter may be assigned to one of six labels (A-F). For example, in FIG. 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexedecimal. Further, the slope of the positive or negative clock transition at which time the input data channels are sampled can be selected ("clock slope").

Figure 15:
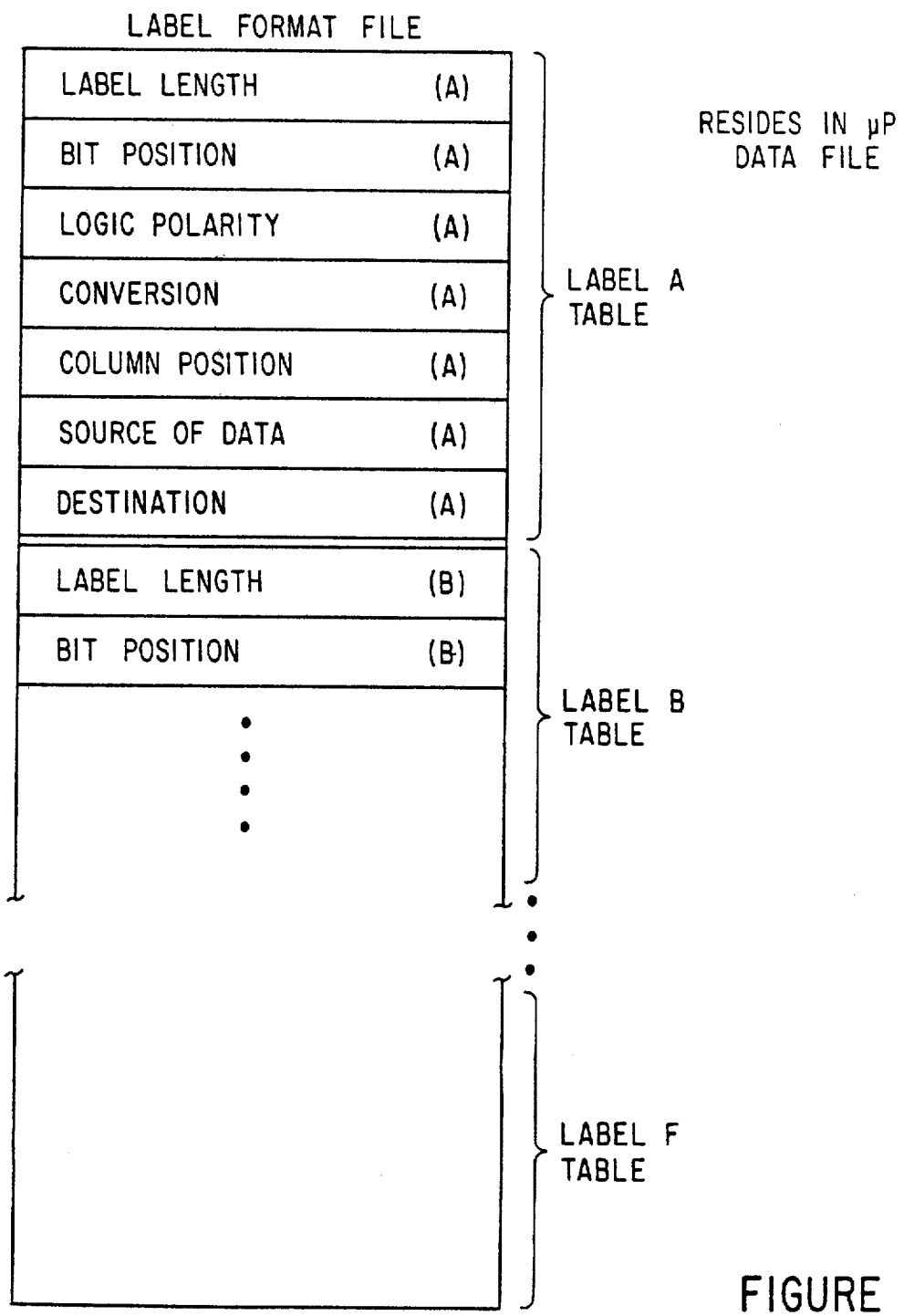
FIG. 15 illustrates the format of the label format file.
Figure 16:
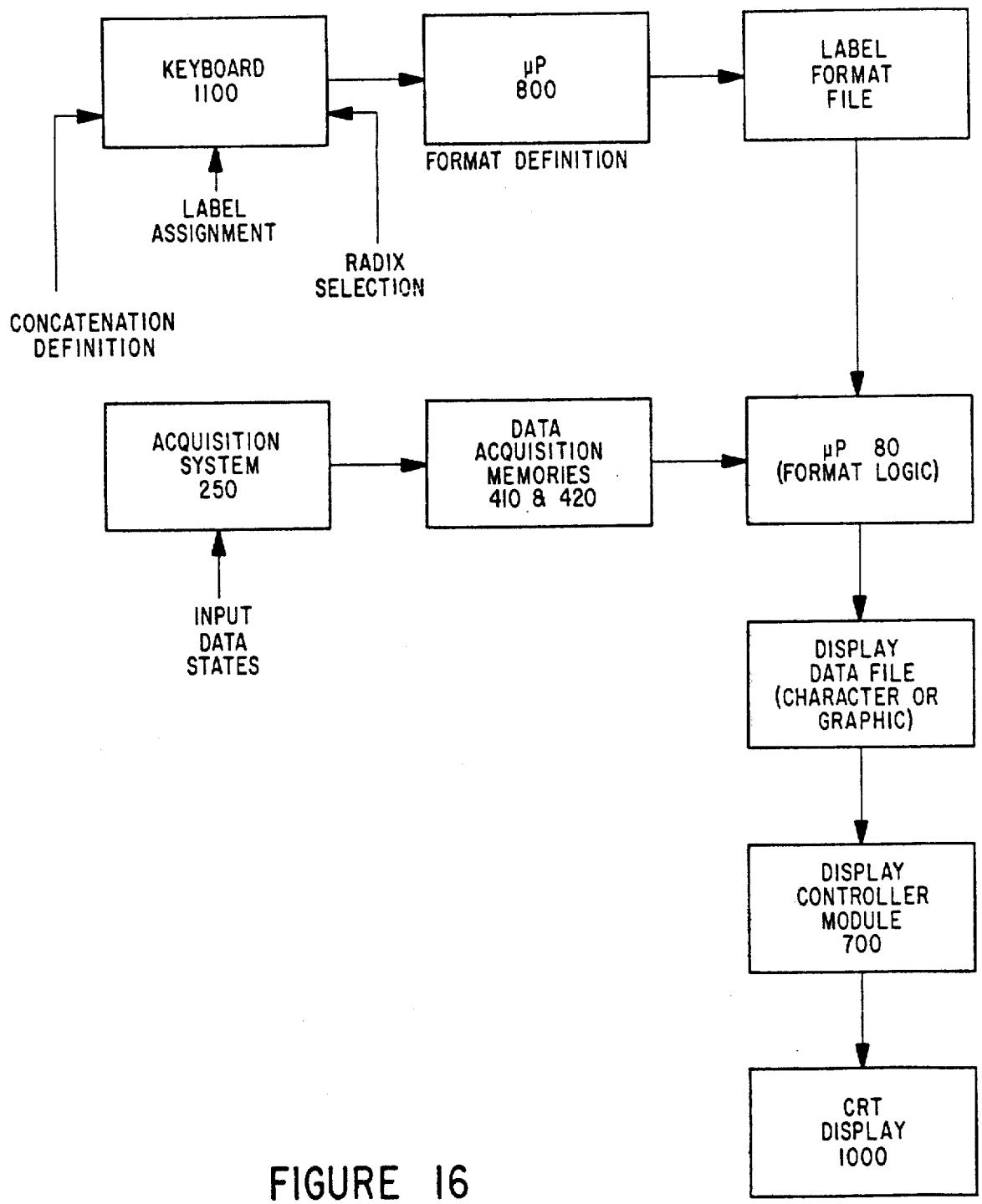
FIG. 16 illustrates the logic flow of the display formatting logic.

Keyboard entries to the microprocessor 800, as shown in FIG. 16, permit the construction of the label format file, shown in more detail in FIG. 15 which, contains the format specification parameters. This is used to process the stored data states in the construction of the alphabetically cancatenated ASCII display data file and the graphic display data file. Either of the display data files is subsequently selected and used for display purposes by the display control module 700 and the CRT display 1000.

Trace Specification

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and/or X's (don't care). In octal, decimal or hexedecimal bases the definition is defined in terms of the appropriate alphanumerics and X's.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be required to occur from 1 to 65536 times before the state condition is satisfied. This form of positioning will locate the nth pass of a loop beginning at a given state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state" requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification by which sampled states will be stored for display. One to seven state conditions may be "OR" specified for collection. Selectively tracing only sampled states of interest eliminates the clutter of unnecessary states and magnifies the apparent size of the trace beyond its 64 terms. Also, an occurrence term may be specified so as to store only every nth satisfaction of an "OR" specified state condition. FIG. 2 illustrates the selective trace of every occurrence of a single state condition.

The count measurement performs a "time" or a "state" count associated with each of the (64) states stored and can be displayed in one of two formats:

absolute—the count from the trace position
relative—the count from the previous trace state The time count is performed by counting the occurrences of an internal clock between sequentially stored states and the display is in the units of seconds. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

Internal Measurement Storage

One complete measurement of 64 sampled states, which includes the sampled states satisfying the state conditions defining the state sequence and specifications of the format, trace, and display, may be internally stored. This "current measurement" may be stored or exchanged with a "stored measurement" for later analysis. A "trace compare" mode of operation (described more fully below) compares results of a previously stored trace with the current measurement and may be utilized as a further qualifier on data storage.

Display Specification

The output display format of the current measurement may be selected from a trace list, a trace graph, or a trace compare.

A trace list, illustrated in FIG. 3, displays a listing of the stored states in their order of occurrence. Twenty trace states, (one per line) are simultaneously presented on the CRT display. The "ROLL" keys allow scanning of the 64 stored states. Each line comprises a line number, the stored state alphabetically stored into assigned labels in their numerical base, and the time or state count if selected.

Figures 4, 5:
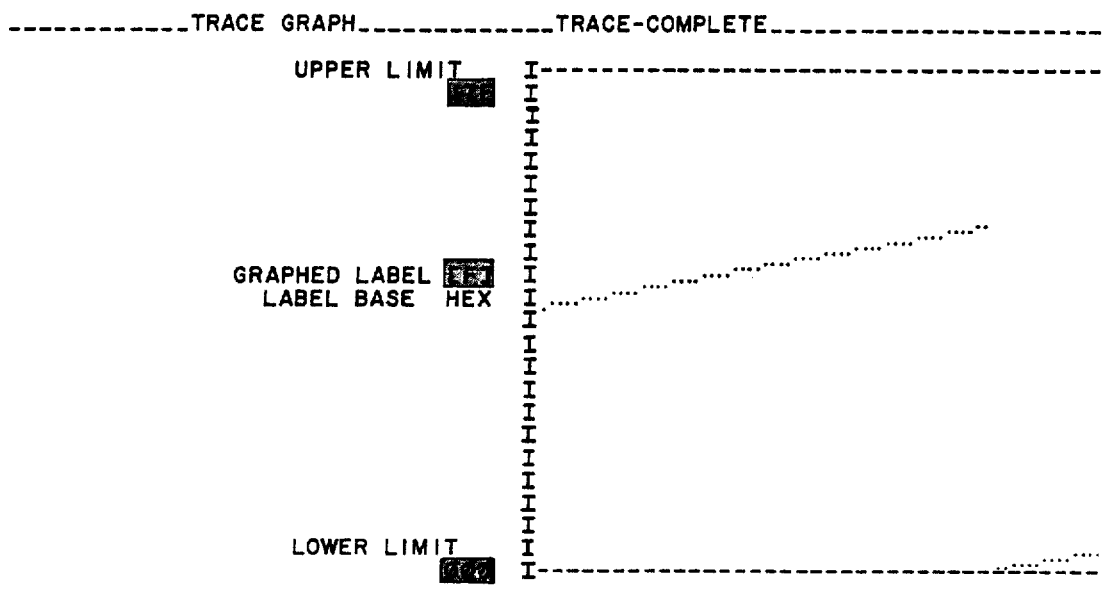
FIG. 4 illustrates a trace graph display of the stored data states.
FIG. 5 illustrates a trace compare output display list.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit" on the vertical axis. Limits can be specified directly or dynamically varied with logarithmic autoranging controls. These facilities allow any portion of a graph to be magnified to a full scale presentation. The 20 points corresponding to the lines viewed in the trace list are intensified. The intensified portion also responds to the "ROLL" controls, and their corresponding absolute value may be read in the trace list.

A trace compare as illustrated in FIG. 5 presents a tabular listing of the difference between results in the "current measurement" and the data in the "stored measurement". The listing is formatted and rolled as in the trace list. The results of the two measurements are exclusive OR'ed)" such that identical corresponding bits are displayed as zeros and unequal bits are displayed as ones. In an octal base a "$\phi 3$" is equivalent to a binary "$\phi\phi\phi$ $\phi 11$" and indicates that the right two bits are different in the two measurements. Trace compare also offers a "compared trace" mode which reruns a measurement until the current and stored measurement are either equal or not equal. (STOP =, or STOP $\neq$) For example, in FIG. 5 of the instrument has rerun trace measurements until the "current measurement" equaled the "stored measurement", as indicated by the "STOP =" specification and revealed by the array of "0"'s in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stored measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurememnt of channel activity.

KEYBOARD AND SPECIFICATION DESIGNATION

Figure 6:
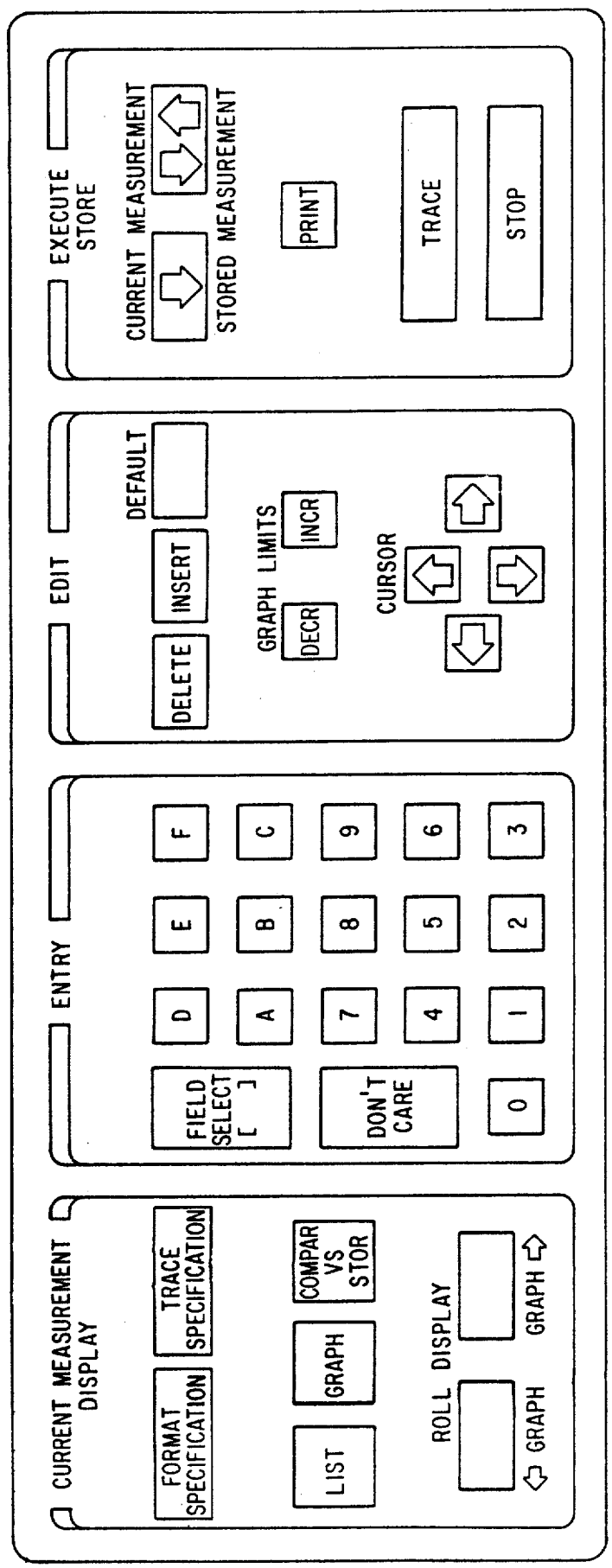
FIG. 6 illustrates the input keyboard.

Referring to FIG. 6, an illustration of the keyboard, the keys are functionally segregated into four blocks, the "current measurement display", "entry", "edit", and "execute". A power up sequence initially defines a default set of specifications, displays the default format specification, then automatically selects a hexadecimal trace list display. Activation of the "ROLL DISPLAY" keys permits the presentation of any portion of the 64 states stored. To change the format specification, the "FORMAT SPECIFICATION" key is pressed. The cursor keys in the edit block are used to move the cursor, designating a selectable entry field by a blinking inverse video field on the interactive display.

The trace specification can be edited by selecting the trace specification interactive display by activating the "trace specification" key. Editing is accomplished in the same manner as the format specification is edited. A general description of the functions of the individual keys is given in Appendix A. A detailed description of the interactive display entry fields is given in Appendix B.

DETAILED DESCRIPTION

Figure 7:
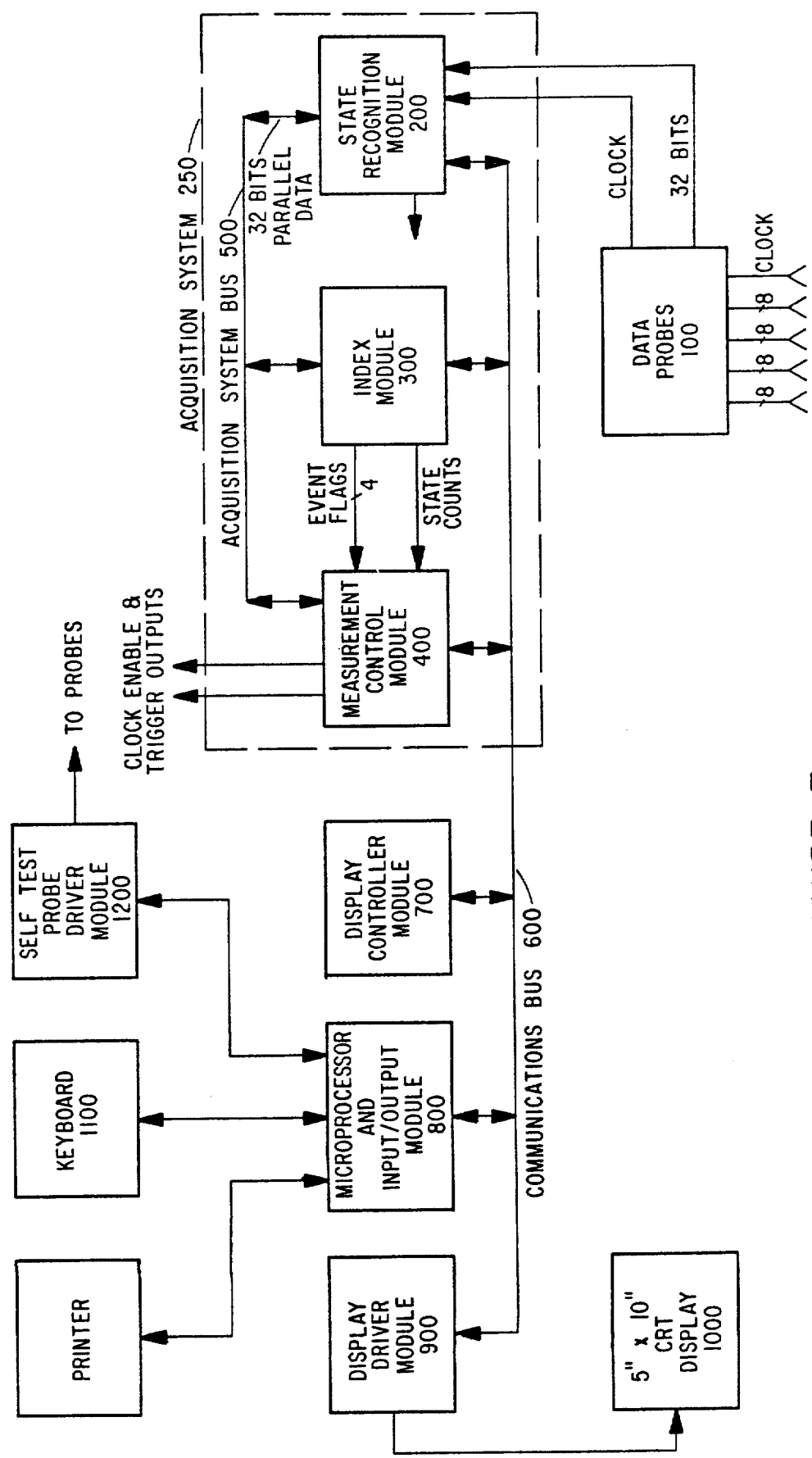
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled state to the selected state conditions and determines the trace position, selective storage events and state count events. The measurement control module 400 also accesses the acquisition system bus 500 and stores state or time counts and sampled data states in response to the events detected by the index module 300.

Figure 8:
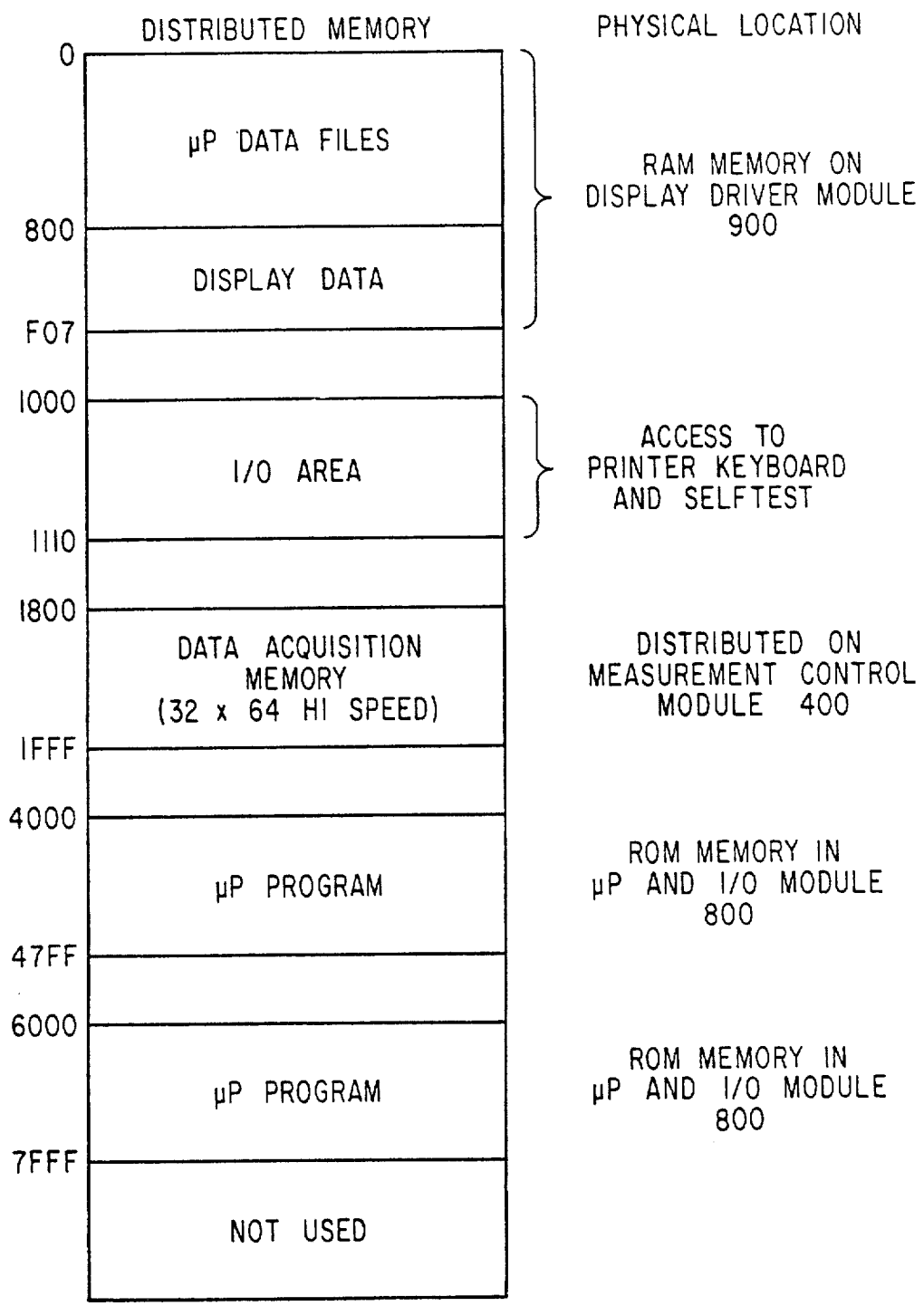
FIG. 8 illustrates the distributed memory addressing of the present invention.
Figure 9:
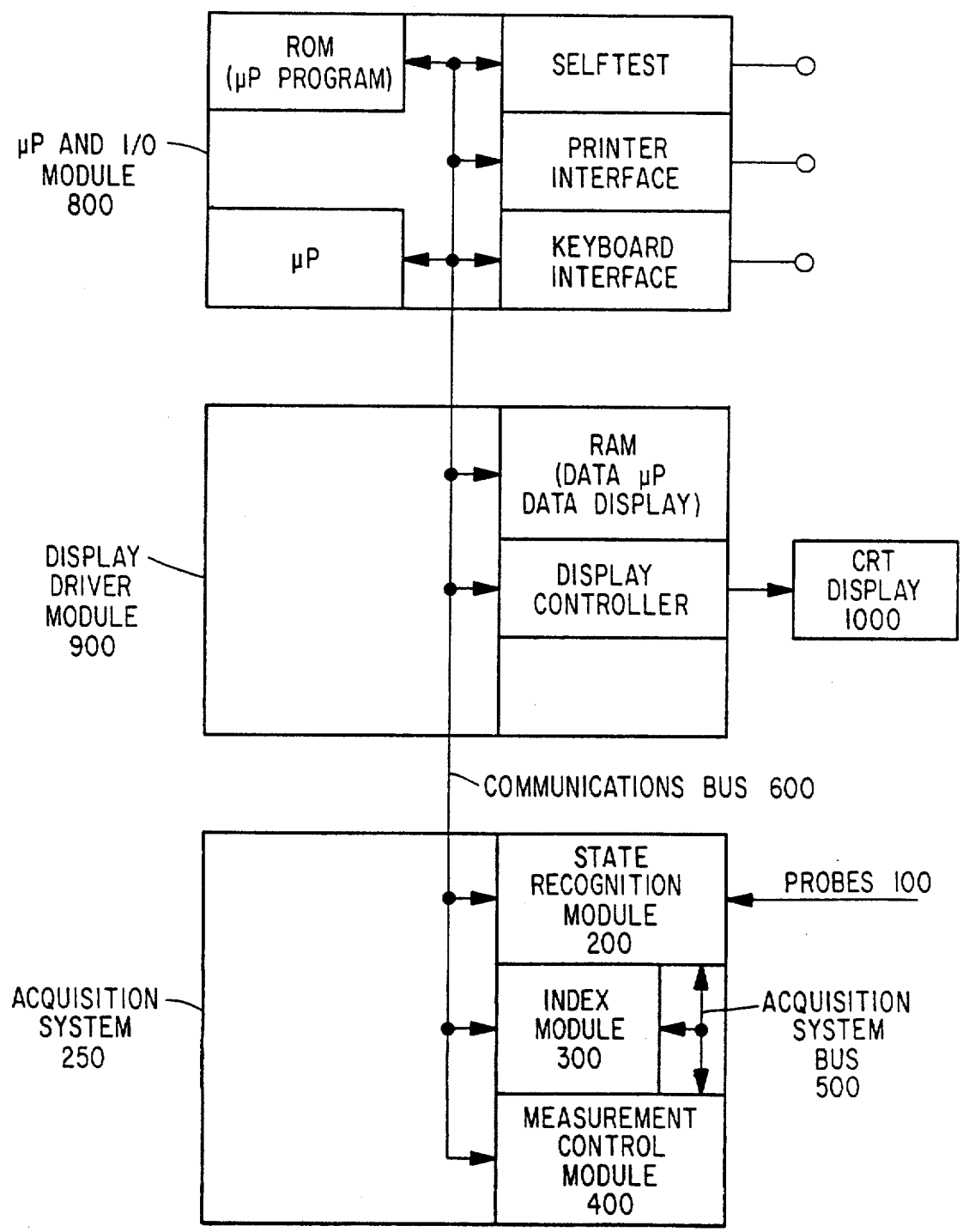
FIG. 9 illustrates the relationship between physical and logical addresses of the distributed memory of FIG. 8.

The modules of the acquisition system 250 communicate with other system modules via the communications bus 600, which provides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
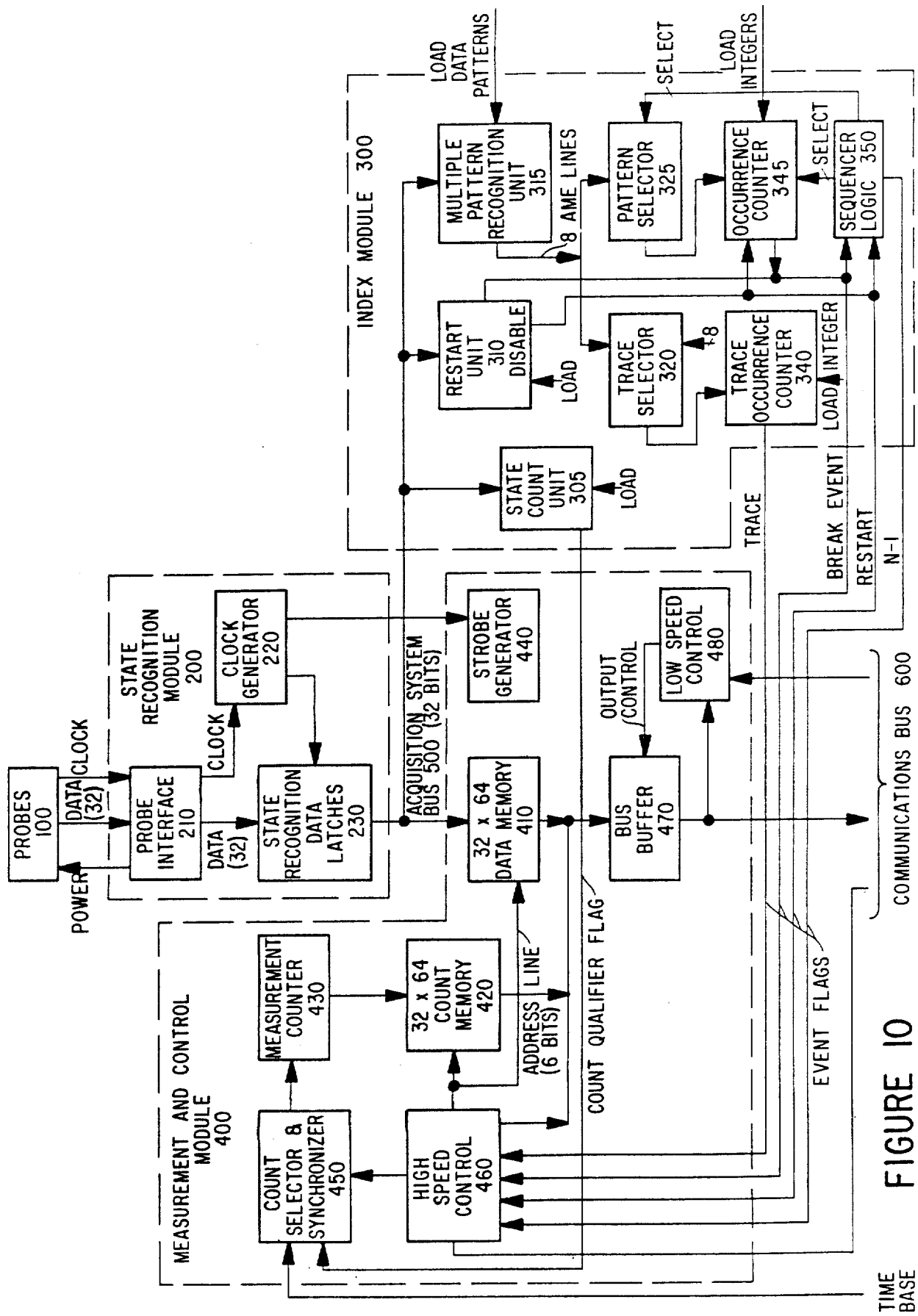
FIG. 10 is a block diagram of the acquisition system.
Figure 11:
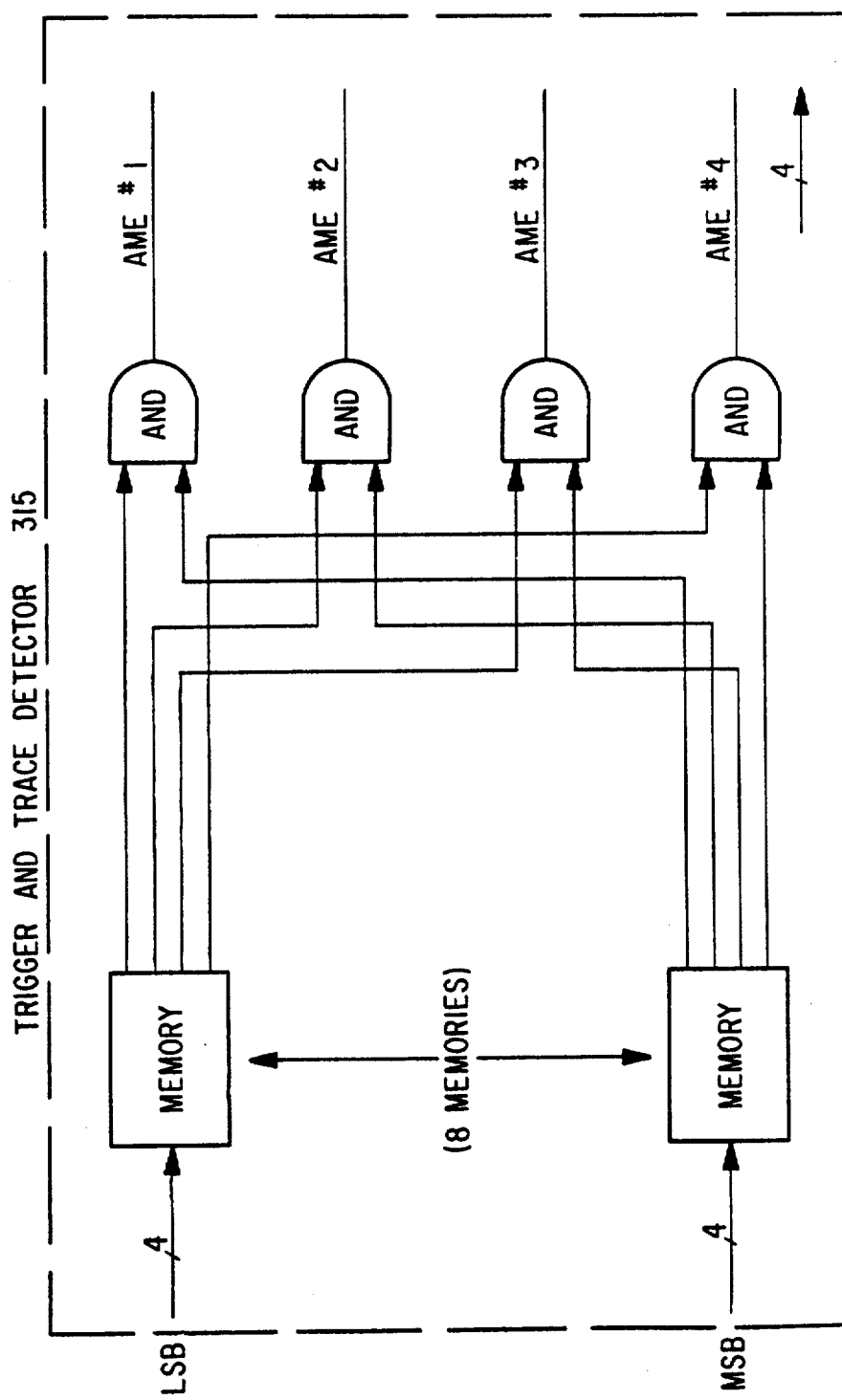
FIG. 11 illustrates a multiple pattern recognition unit.
Figure 12:
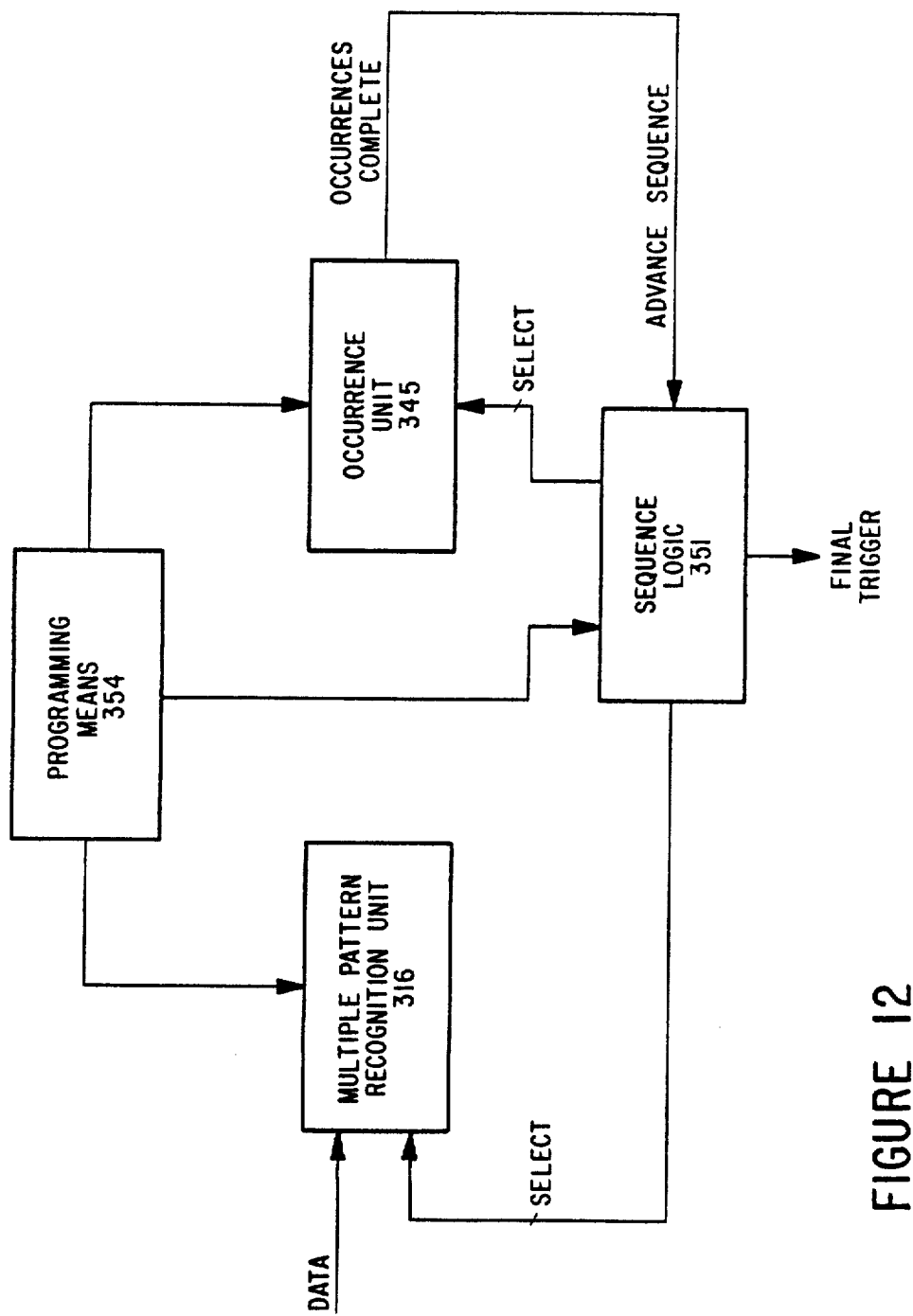
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described the copending patent application entitled "DIGITAL PATTERN TRIGGERING CIRCUIT", U.S. Patent application No. 743,188 filed Nov. 19, 1976, by William A. Farnbach. As illustrated in FIG. 11, the multiple pattern recognition unit 315 comprises 2 parts of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N-1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count unit 305 strobes a counter in the measurement control module 400 each time the selected state condition to be counted is detected.

Figure 13:
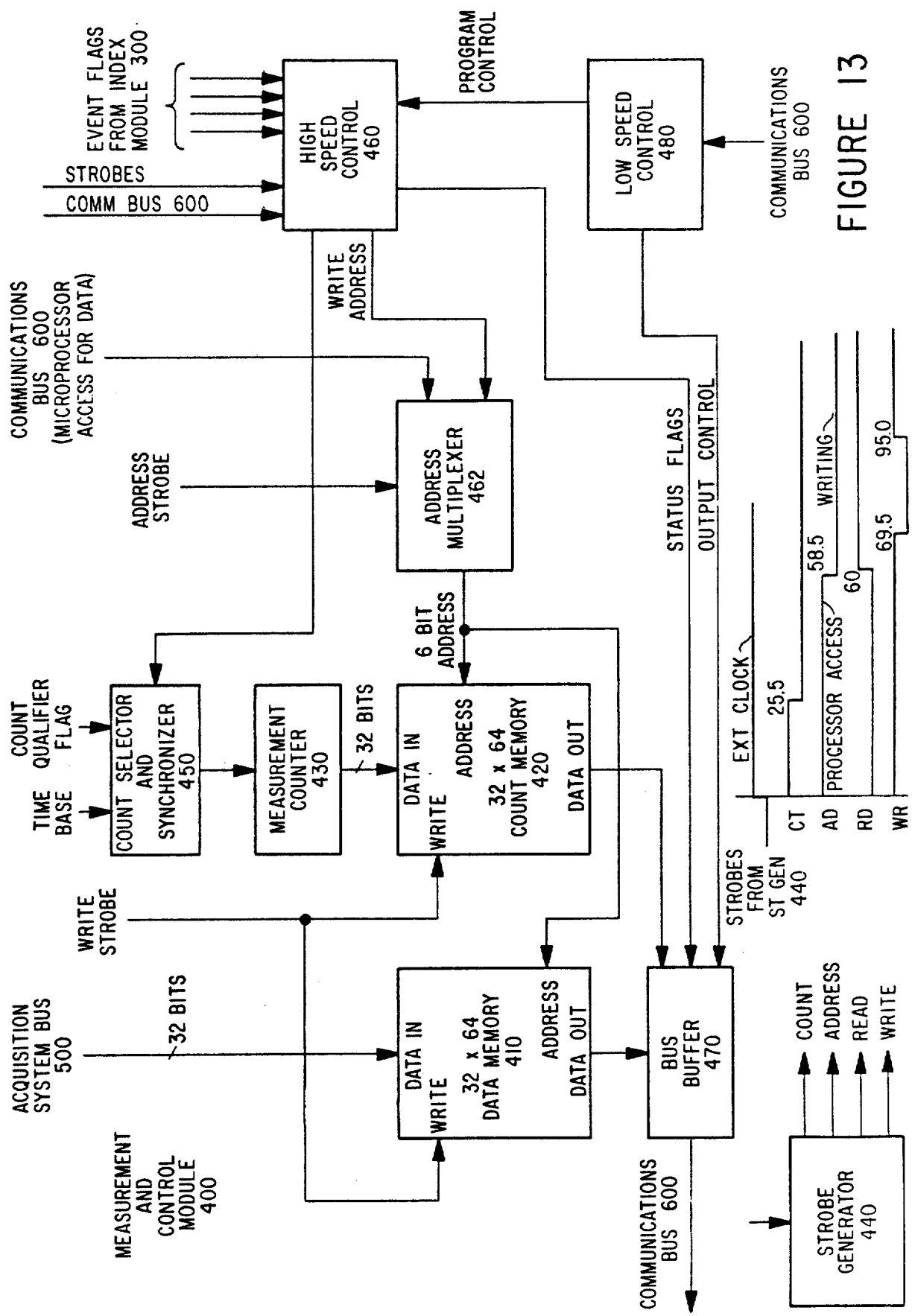
FIG. 13 illustrates the measurement and control module.
Figure 14:
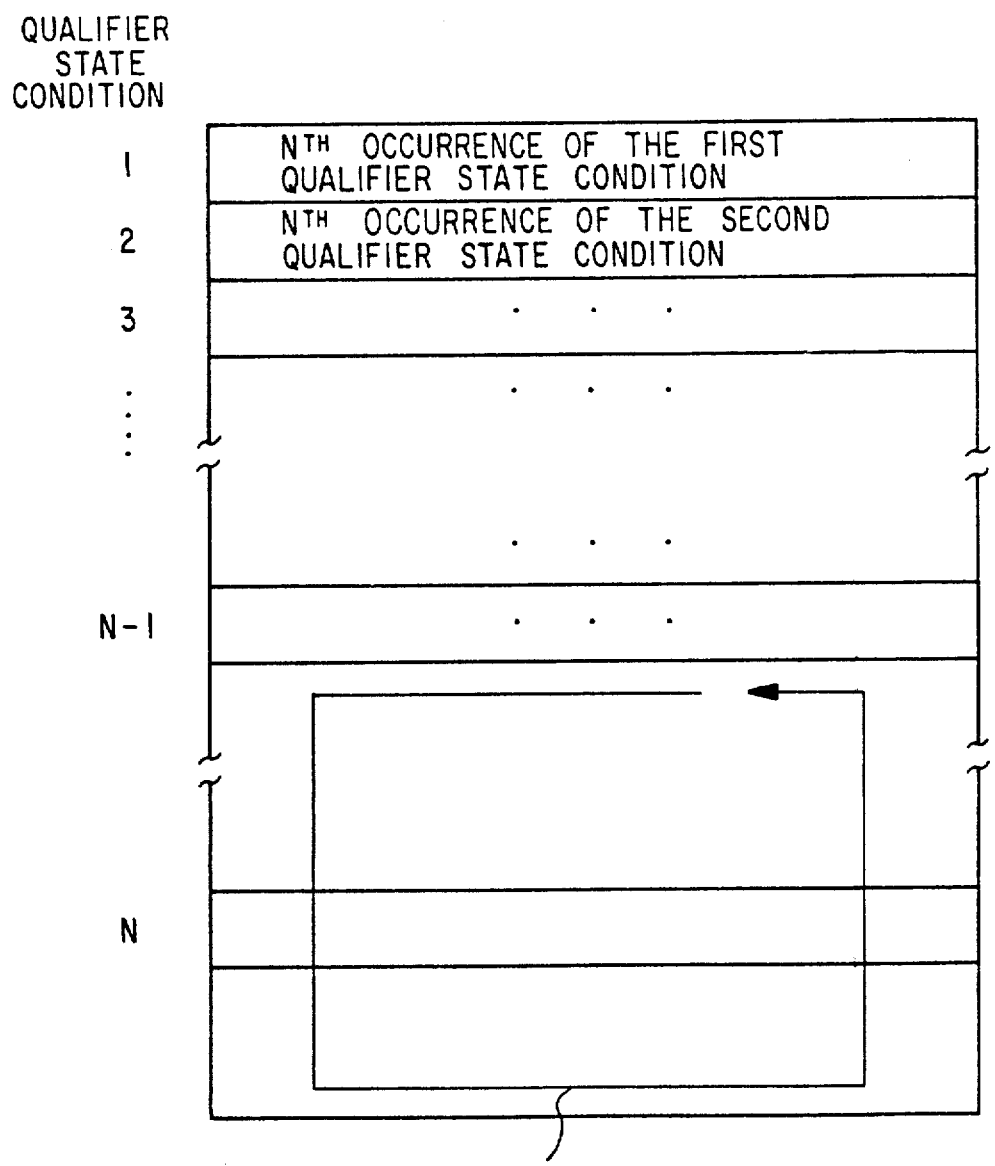
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1-(N-1). Upon detection of the "N-1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

APPENDIX A

GENERAL DESCRIPTION—KEYBOARD

CURRENT MEASUREMENT DISPLAY

LINES 3 THROUGH 24 ARE DEPENDENT ON DISPLAYED MENU CHOSEN, WHICH MAYBE SELECTED BY KEYS IN CURRENT MEASUREMENT BLOCK.

| | |
|---|---|
| FORMAT SPECIFICATION | SELECT CLOCK SLOPE AND FORMAT 32 CHANNELS INTO LOGICAL LABELS AND DESIRED LOGIC POLARITY AND NUMERICAL BASE. |
| TRACE SPECIFICATION | DEFINE TRACE POSITION, SELECTIVE TRACE AND COUNT MEASUREMENT. |
| LIST | DISPLAY RESULTANT CURRENT TRACE AND COUNT DATA. |
| GRAPH | GRAPH RESULTANT CURRENT TRACE DATA FOR SELECTED LABEL. THE 20 INTENSIFIED DOTS CORRESPOND TO TRACE LIST DATA. |
| COMPARE VS STORE | DISPLAY "EXCLUSIVE OR" OF VALID CURRENT DATA WITH VALID STORED DATA, AND SELECT COMPARED TRACE MODE. |
| ROLL DISPLAY | VIEW TRACE LIST OR TRACE COMPARE DATA. TRACE GRAPH SHOWS INTENSIFIED DOTS THAT |
| GRAPH GRAPH | REPRESENT THE TRACE LIST DATA DISPLAYED. |

ENTRY

ALL PROGRAM ENTRIES ARE MADE IN INVERSE VIDEO FIELDS AT THE BLINKING CURSOR, AND MAYBE CHANGED BY ENTRY BLOCK OF KEYS:

| | |
|---|---|
| FIELD SELECT [ ] | ALL FIELDS ENCLOSED WITH BRACKETS [ ] ARE CHANGED BY THIS KEY. THE 1610A SELECTS ONLY ALLOWED CHOICES. |
| 0-9, A-F, X | ALL OTHER FIELDS MAYBE CHANGED USING THESE KEYS. |

EDIT

DISPLAYED MENUS MAYBE EDITED BY EDIT BLOCK OF KEYS:

| | |
|---|---|
| DELETE INSERT | USED IN TRACE SPECIFICATION MENU ONLY TO OPTIONALLY DELETE OR INSERT STATES TO SPECIFY TRACE POSITION AND SELECTIVE TRACE. A MAXIMUM OF 6 STATES MAYBE USED BETWEEN TRACE POSITION AND SELECTIVE TRACE. |

| | |
|---|---|
| DEFAULT | RETURN DISPLAYED MENU TO KNOWN (PRESET, TRACEABLE) CONDITION. |
| INCR  DECR | USED IN TRACE GRAPH ONLY TO AUTOMATICALLY CHANGE UPPER OR LOWER GRAPH LIMITS. |
| | TO MOVE BLINKING CURSOR TO DESIRED FIELD. |

EXECUTE

THE REMAINING KEYS ARE THE EXECUTE BLOCK OF KEYS:

| | |
|---|---|
| CURRENT MEASUREMENT | KEY SAVES CURRENT SPECIFICATION AND DATA MEASUREMENT IN A STORED FILE. THE CURRENT SPECIFICATION AND DATA REMAINS UNCHANGED. |
| STORED MEASUREMENT | KEY EXCHANGES CURRENT AND STORED MEASUREMENT FILES. |
| PRINT | PRINT CURRENT DISPLAY, EXCEPT TRACE GRAPH ON AN HP 9866 LINE PRINTER USING CONNECTOR ON REAR OF 1610A. TRACE LIST AND TRACE COMPARE WILL PRINT CURRENT PAGE AND ANY REMAINING DATA IN MEMORY. |
| TRACE | EXECUTES CURRENT SPECIFICATION, AND IF DISPLAY IS FORMAT SPECIFICATION OR TRACE SPECIFICATION, THE 1610A SWITCHES DISPLAY TO TRACE LIST. IF TRACE IS HELD DOWN, THE MEASUREMENT IS TRACED CONTINUOUSLY. IF COMPARE TRACE MODE IS SET FOR [STOP≠] OR [STOP=] THE MEASUREMENT IS TRACED UNTIL COMPARED CONDITION IS MET. THE INSTRUMENT STATUS (1ST LINE) IS "COMPARED TRACE-FAILED", IMPLIES CONDITION NOT MET, OR "COMPARED TRACE-COMPLETE", IMPLIES CONDITION MET. |
| STOP | STOPS ANY MEASUREMENT TRACE, COMPARED TRACE OR PRINT IN PROCESS. |

APPENDIX B

DETAILED FIELD/S DESCRIPTION

CLOCK SLOPE:

EXAMPLES: CLOCK SLOPE [+]
CLOCK SLOPE [-]

PURPOSE: TO SELECT CLOCK TRANSITION TO STROBE POD DATA INTO 1610A.

DETAILED FIELD/S DESCRIPTION

LABEL ASSIGNMENT AND ACTIVE CHANNELS:

```
EXAMPLE:    POD4      POD3      POD2      POD1
            7------0  7------0  7------0  7------0
            AAAAAAAA  AAAAAAAA  DDDDDDDD  XXXXXXXF
            11111111  11111111  11111111         1
                                ACTIVE CHANNELS
```

PURPOSE: TO ASSIGN LABELS A,B,C,D,E OR F TO ANY NUMBER OF CONTINUOUS CHANNELS INDEPENDENT OF POD BOUNDARIES. IN THE ABOVE EXAMPLE THE LABEL A IS ASSIGNED TO 16 BITS OF POD3 AND POD4, AND MAY REPRESENT A 16 BIT ADDRESS. LABEL D IS ASSIGNED 8 BITS ON POD2 AND MAY REPRESENT AND 8 BIT DATA BUS. LABEL F IS ASSIGNED TO BE A SINGLE BIT QUALIFIER (READ, WRITE) AND IS ASSIGNED TO LEAST SIGNIFICANT BIT ON POD1.

ANY UNUSED CHANNELS MAYBE TURNED OFF BY PUTTING A "X" IN GIVEN CHANNELS.

COMMENT: AS MANY AS SIX LABELS OR AS FEW AS ONE MAYBE ASSIGNED ACROSS THE 32 CHANNELS. IF A LABEL IS SPLIT, SUCH AS

```
            AABBBAAA      (LABEL IS NOT CONTINUOUS)
```

THEN AN ERROR MESSAGE "ERROR-SPLIT LABEL" IS DISPLAYED AND THE CURSOR IS LOCKED TO LABEL ASSIGNMENT FIELDS UNTIL THE ERROR IS CORRECTED.
PRESSING DEFAULT KEY WILL ASSIGN LABEL F TO ALL 32 CHANNELS.
ACTIVE CHANNELS ARE SHOWN BY "1" MARKS FOR EACH ASSIGNED CHANNEL. ABSENCE OF "1" INDICATE LOW CHANNEL(BIT) ACTIVITY, AND ARE GOOD INDICATORS OF POD CLIPS THAT MAY HAVE FALLEN OFF. CHANNEL ACTIVITY IS NOT DISPLAYED WHILE 1610A IS TRACEING.

IF POD IS CONNECTED TO DATA PORT ON REAR OF 1610A, THE CHANNEL ACTIVITY "1" FOR LEAST SIGNIFICANT 2 BITS IS NOT SHOWN( DUE TO SYNCHRONOUS 8 BIT COUNT AND 1610A).

LOGIC POLARITY:

```
EXAMPLE:   LABEL         A    D    F
           LOGIC POLARITY [-] [-] [+]
           (+,-)
```

PURPOSE: TO SELECT A LOGIC POLARITY FOR EACH ASSIGNED LABEL.

NUMERICAL BASE:

| EXAMPLE: | LABEL | A | B | F |
|---|---|---|---|---|
| | NUMERICAL BASE (BIN,OCT DEC,HEX) | [HEX] | [OCT] | [BIN] |

PURPOSE: TO SELECT A NUMERICAL BASE TO BE HEXIDECIMAL(HEX), OCTAL(OCT),DECIMAL(DEC),OR BINARY(BIN) FOR EACH ASSIGNED LABEL.

---

TRACE POSITION:

| EXAMPLE: | [START] TRACE |
|---|---|
| | [CENTER] TRACE |
| | [ END ] TRACE |

PURPOSE: TO SELECT TRACE POSITION TO BE SOME GIVEN STATE AND ITS POSITION IN RESULTANT DATA TRACE FILE SHOULD BE AT [START] FOLLOWED BY SELECTIVE TRACE STATES,OR AT [CENTER] SHOWING ANY SELECTIVE STATES BEFORE AND AFTER "CENTER STATE",OR AT [END] SHOWING ANY SELECTIVE STATES BEFORE THE "END STATE".

---

| EXAMPLE: | LABEL | A | OCCUR |
|---|---|---|---|
| | BASE | HEX | DEC |
| | FIND IN SEQUENCE | 10 | 00001 |
| | THEN | 20 | 00001 |
| | THEN | 30 | 00005 |
| | [START ] TRACE | 40 | 00001 |
| | SEQ.RESTART [ON] | 50 | |

COMMENT: THIS EXAMPLE HAS THE FOLLOWING MEANING FOR DEFINING TRACE POSITION:
FIND IN SEQUENCE 00001 OCCURANCE OF STATE 10,THEN THE 00001 OCCURANCE OF STATE 20, THEN THE 00005 OCCURANCE OF STATE 30,AND [START] TRACE AT 00001 OCCURANCE OF STATE 40.
IF DURING THIS SEQUENCE THE RESTART STATE 50 IS ENCOUNTERED BEFORE REACHING THE 00001 OCCURRENCE OF STATE 40,THE MEASUREMENT RESTARTS,TO FIND IN SEQUENCE THE 00001 OCCURANCE OF STATE 10,THEN 00001 OCCURANCE OF STATE 20 ETC.

NOTE: IF A SEQUENCE STATE IS DEFINED TO BE THE SAME AS THE RESTART STATE,THE SEQUENCE STATE DOMINATES.
IF [CENTER] OR [END] WERE SELECTED,SELECTIVE TRACE STARTS AT COMPLETION OF 5 OCCURANCES OF STATE 30 (SEE SELECTIVE TRACE).

---

SELECTIVE TRACE:

| EXAMPLE: | LABEL | A | OCCUR |
|---|---|---|---|
| | [ALL STATES] | | |

PURPOSE: TO TRACE ALL STATES.

EXAMPLE:      LABEL        A        OCCUR
              BASE         HEX      DEC
     TRACE
     (ONLY STATE)          6B       00001
              OR           7X
              OR           8X

PURPOSE: TO SELECTIVELY TRACE DESIRED STATES.

COMMENTS: THE ABOVE EXAMPLE HAS FOLLOWING MEANING:
          DO A SIMULTANEOUS TRACE OF 00001 OCCURANCE
          OF STATES 6B OR 7X (70 TO 7F) OR
          8X (80 TO 8F).

COUNT:

EXAMPLE:       LABEL       A
               BASE        HEX

COUNT ( OFF )
     COUNT (STATE)         7X
     COUNT (TIME )

PURPOSE: TO SELECT COUNT MEASUREMENT TO BE (OFF), OR COUNT (STATE)
         OR COUNT (TIME).

COMMENT: WHEN COUNT IS (OFF), THE TRACE LIST DOES NOT SHOW
         COUNT DATA FOR THE NEXT TRACE MEASUREMENT.
         WHEN COUNT (STATE) IS SELECTED, A 32 BIT COUNT OF
         SELECTED STATE 7X (70 TO 7F) IS STORED IN MEMORY
         WITH EACH POD DATA STATE STORED. THE RESULTANT COUNT
         DATA IS DISPLAYED IN TRACE LIST FOR NEXT TRACE
         MEASUREMENT.
         WHEN COUNT (TIME) IS SELECTED, A COUNT VALUE OF TIME IS
         STORED FOR EACH POD DATA STATE STORED IN MEMORY. THE
         RESULTANT TIME DATA IN DISPLAYED IN TRACE LIST FOR
         NEXT TRACE MEASUREMENT.

STATE COUNT OR TIME (ABS), (REL):

EXAMPLE:       LABEL        A        STATE COUNT
               BASE         HEX      DEC
                                     (ABS)

SEQUENCE           1B    -  1043
         SEQUENCE           2D    -  1033
         SEQUENCE           3D    -  1023
         START              4D       0
         +01                6D    +  20
         +02                7D    +  30
         +03                71    +  31

| LABEL<br>BASE | A<br>HEX | STATE COUNT<br>DEC<br>[REL] |
|---|---|---|
| SEQUENCE | 10 | |
| SEQUENCE | 20 | 10 |
| SEQUENCE | 30 | 20 |
| START | 40 | 1023 |
| +01 | 60 | 20 |
| +02 | 70 | 10 |
| +03 | 71 | 1 |

| LABEL<br>BASE | A<br>HEX | TIME<br>DEC<br>[ABS] |
|---|---|---|
| SEQUENCE | 10 | − 206.3 US |
| SEQUENCE | 20 | − 200.2 US |
| SEQUENCE | 30 | − 185.1 US |
| START | 40 | .0 US |
| +01 | 60 | + 80.6 US |
| +02 | 70 | + 100.0 MS |
| +03 | 71 | + 100.5 MS |

PURPOSE: TO VIEW TRACE LIST AND SELECT [ABS] OR
[REL] FOR STATE COUNT OR TIME DATA.

COMMENTS: WHEN ABSOLUTE [ABS] IS SELECTED THEN STATE COUNT
OR TIME IS DISPLAYED IN +/− ABSOLUTE VALUES WITH
RESPECT TO START STATE 40. ALL STATES BEFORE START
STATE 40 ARE SHOWN WITH "−" COUNT VALUES. START
STATE 40 IS SHOWN AS ALWAYS 0. ALL STATES SHOWN
AFTER START STATE 40 ARE SHOWN WITH "+" COUNT
VALUES.
WHEN RELATIVE [REL] IS SELECTED, THEN STATE COUNT
OR TIME IS DISPLAYED SHOWING COUNT VALUES RELATIVE
TO PREVIOUS STATE COUNT VALUE (IF VALID)
WITHOUT SIGN.

GRAPHED LABEL:

EXAMPLE:
GRAPHED LABEL (A)

GRAPHED LABEL (F)

PURPOSE: TO SELECT A DEFINED LABEL A,B,C,D,E OR F TO BE
GRAPHED.

DETAILED FIELD/S DESCRIPTION

UPPER/LOWER LIMITS:

EXAMPLE:
UPPER LIMIT
177

```
            LOWER LIMIT
                000
```

PURPOSE: TO CHANGE UPPER OR LOWER GRAPH LIMITS.

COMMENT: GRAPH LIMITS MAYBE CHANGED USING ENTRY KEYS OR THE LIMITS MAYBE AUTOMATICALLY INCREMENTED OR DECREMENTED USING INCR OR DECR KEYS IN EDIT BLOCK.
THE UPPER LIMIT MUST BE GREATER THAN LOWER LIMIT, ELSE AN "ERROR-OVERLAPPING LIMITS" IS DISPLAYED AND GRAPH DOTS ARE NOT DISPLAYED.

DETAILED FEILD/S DESCRIPTION

COMPARED TRACE MODE:

```
EXAMPLE:   LABEL      A      COMPARED
           BASE       HEX    TRACE MODE
                             (OFF)
           SEQUENCE   00
           SEQUENCE   00
           SEQUENCE   00
           START      00
           +01        30
           +02        00
```

PURPOSE: TO SHOW THE "EXCLUSIVE OR" OF CURRENT DATA WITH STORED DATA. ALL 0'S IMPLIES SAME DATA IN BOTH FILES AND NON 0'S (30) SHOWS THAT DATA STATE DOES NOT COMPARE (BITS 4 AND 5, ASSUMING LSB IS BIT 0).

```
EXAMPLE:   LABEL      A      COMPARED
           BASE       HEX    TRACE MODE
                             (STOP=)

LABEL      A      COMPARED
           BASE       HEX    TRACE MODE
                             (STOP#)
```

PURPOSE: TO SELECT COMPARED TRACE MODE TO BE STOP WHEN EQUAL (STOP=), OR STOP WHEN NOT EQUAL (STOP#).

COMMENTS: WHEN (STOP=) IS CHOSEN THE MEASUREMENT IS TRACED UNTIL VALID CURRENT DATA EQUALS (=) VALID STORED DATA. THE STATUS OF INSTRUMENT WILL BE:

"COMPARED TRACE-FAILED"

WHICH MEANS CURRENT DATA DOES NOT EQUAL STORED DATA. THE 1610A THEN TRACES AGAIN SHOWING:

"COMPARED TRACE-IN PROCESS"

AND COMPARES ANOTHER SET OF DATA. THIS PROCESS CONTINUES UNTIL:

```
               "COMPARED TRACE-COMPLETE"

WHICH MEANS VALID CURRENT FILE EQUALS VALID STORED FILE
       DATA.
         A SIMILAR OPERATION EXISTS FOR [STCP*],EXCEPT THIS
       .MEASUREMENT CONTINUES UNTIL FILES DO NOT COMPARE.
        NOTE: THIS IS NOT A REAL TIME MEASUREMENT,BUT RATHER
        A "SAMPLED COMPARED MODE" THAT IS DEPENDENT IN PART
        UPON DATA CLOCK RATES,TRACE SPECIFICATION.
        THIS MEASUREMENT MODE MUST BE TURNED [OFF]
        TO OBTAIN SINGLE OR CONTINUOUS TRACE MODE.
```

We claim:

1. Apparatus for selecting, storing and displaying a qualified subset of the states occurring in a collection of digital signals, the apparatus comprising:

control means for designating from among the collection of digital signals a qualification state and a trigger state;

input means coupled to receive the collection of digital signals for performing signal conditioning thereon according to preselected thresholds to produce a collection of conditioned signals;

qualification state detection means coupled to the collection of conditioned signals and to the control means for producing a qualifier signal upon the occurrence of the designated qualification state in the collection of conditioned signals;

trigger state detection means coupled to the collection of conditioned signals and to the control means for producing a trigger signal upon the occurrence of the designated trigger state in the collection of conditioned signals;

storage means coupled to the collection of conditioned signals, the qualifier signal and to the trigger signal for storing those states in the collection of conditioned signals producing the qualifier signal, until a preselected number of such storage operations occur subsequent to the occurrence of the trigger signal; and display means coupled to the storage means for displaying the states stored therein.

2. Apparatus as in claim 1 wherein the qualification state comprises the logical disjunction of a plurality of states designated with the control means.

3. Apparatus as in claim 1 wherein the storage means has m-many locations and retains the most recent m-many states stored therein, wherein the control means is additionally for designating an integer k in the range $o \leq k \leq m$, and wherein the storage means is responsive to the control means by storing k-many states following the occurrence of the trigger signal.

4. Apparatus as in claim 2 or claim 3 wherein the control means is additionally for designating a series of sequence states and wherein the trigger state detection means requires the designated sequence states to occur in sequence prior to the occurrence of the designated trigger state in order to produce the trigger signal.

5. Apparatus as in claim 2 or claim 3 wherein the control means is additionally for designating an integer n and wherein the qualification state detection means produces the qualifier signal only upon each nth occurrence of the designated qualification state.

6. A method of storing a selected subset of the states occurring in a collection of digital signals, the method comprising the steps of:

entering into a logic state analyzer a trigger state condition whose occurrence corresponds to a preselected location in the selected subset; and entering into the logic state analyzer a qualifier state condition whose presence is required for the logic state analyzer to store as a member of the selected subset a state occurring in the collection of digital signals.

7. A method as in claim 6 wherein the entered qualifier state condition is the nth occurrence of a selected state.

* * * * *

UNITED STATES PATENT AND TRADEMARK OFFICE
CERTIFICATE OF CORRECTION

PATENT NO. : 4,373,193

DATED : February 8, 1983

INVENTOR(S) : George A. Haag, et al.

It is certified that error appears in the above—identified patent and that said Letters Patent is hereby corrected as shown below:

Column 4, line 24, "OR'ed)"" should be --"OR'ed"--;

Column 5, line 62, "parts" should be --pairs--.

Signed and Sealed this

Sixteenth Day of August 1983

[SEAL]

Attest:

GERALD J. MOSSINGHOFF

Attesting Officer     Commissioner of Patents and Trademarks